United States Patent
Yang (10) Patent No.: US 10,402,005 B2
(45) Date of Patent: Sep. 3, 2019

(54) TOUCH METHOD AND DEVICE, TOUCH DISPLAY APPARATUS

(71) Applicants: BOE Technology Group Co., Ltd., Beijing (CN); HEFEI BOE Optoelectronics Technology Co., Ltd., Hefei (CN)

(72) Inventor: Qing Yang, Beijing (CN)

(73) Assignees: BOE Technology Group Co., Ltd., Beijing (CN); Hefei BOE Optoelectronics Technology Co., Ltd., Hefei (CN)

( * ) Notice: Subject to any disclaimer, the term of this patent is extended or adjusted under 35 U.S.C. 154(b) by 64 days.

(21) Appl. No.: 15/258,503

(22) Filed: Sep. 7, 2016

(65) Prior Publication Data

US 2017/0277336 A1    Sep. 28, 2017

(30) Foreign Application Priority Data

Mar. 24, 2016   (CN) .......................... 2016 1 0173681

(51) Int. Cl.
*G06F 3/041*        (2006.01)
(52) U.S. Cl.
CPC .......... *G06F 3/0416* (2013.01); *G06F 3/0412* (2013.01)
(58) Field of Classification Search
CPC ...... G06F 3/0418; G06F 3/041; G06F 3/0412; G06F 3/0416
See application file for complete search history.

(56) References Cited

U.S. PATENT DOCUMENTS

| | | | | |
|---|---|---|---|---|
| 2009/0174679 A1* | 7/2009 | Westerman | ......... | G06F 3/03547 345/173 |
| 2014/0168171 A1* | 6/2014 | Oh | .......................... | G06F 3/044 345/178 |
| 2014/0306912 A1* | 10/2014 | Woolley | ................ | G06F 3/0418 345/173 |
| 2015/0145820 A1* | 5/2015 | Huang | .................... | G06F 3/044 345/174 |

(Continued)

FOREIGN PATENT DOCUMENTS

| | | |
|---|---|---|
| CN | 103558944 A | 2/2014 |
| CN | 103631443 A | 3/2014 |

(Continued)

OTHER PUBLICATIONS

Jun. 19, 2018—(CN) First Office Action Appn 201610173681.0 with English Translation.

*Primary Examiner* — Dong Hui Liang
(74) *Attorney, Agent, or Firm* — Banner & Witcoff, Ltd.

(57) ABSTRACT

A touch method, a touch device, and a touch display apparatus are provided. The touch method comprises: acquiring touch information corresponding to a touch operation, the touch information at least including a touch position and a touch area; determining a touch region according to the touch position; comparing the touch area with a reference area to obtain a comparison result; judging whether the touch operation is a mis-touch according to the comparison result and the touch region; not executing an instruction of the touch operation in the case that the touch operation is the mis-touch; and executing the instruction of the touch operation in the case that the touch operation is not the mis-touch.

13 Claims, 6 Drawing Sheets

(56) References Cited

U.S. PATENT DOCUMENTS

2016/0154526 A1* 6/2016 Hao ..................... G06F 3/044
                                                        345/174

FOREIGN PATENT DOCUMENTS

| CN | 104345947 A | 2/2015 |
| CN | 104657689 A | 5/2015 |
| CN | 105302369 A | 2/2016 |
| CN | 105426048 A | 3/2016 |
| JP | 2015032264 A | 2/2015 |

* cited by examiner

TOUCH METHOD AND DEVICE, TOUCH DISPLAY APPARATUS

This application claims priority to and the benefit of Chinese Patent Application No. 201610173681.0 filed on Mar. 24, 2016, which application is incorporated herein in its entirety.

TECHNICAL FIELD

Embodiments of the present disclosure relate to a touch method, a touch device, and a touch display apparatus.

BACKGROUND

With development of a touch display technology, a narrow-frame touch display apparatus has been widely used. A touch display screen in the narrow-frame touch display apparatus has features of larger display region and narrower frame.

A user controls the touch display screen to display an image by performing a touch operation on the touch display screen. Exemplarily, the touch display screen generally includes a touch panel and a display panel which are stacked sequentially. The touch display apparatus further includes a processor and a touch Integrated Circuit (IC), the touch IC is respectively connected with the processor and the touch panel, and the processor is further connected with the display panel. In the case that the user performs the touch operation on the touch panel with a finger, the touch panel generates a touch signal; the touch IC acquires the touch signal generated by the touch panel, and determines position information of a touch point according to the acquired touch signal; and the touch IC further sends the position information of the touch point to the processor, so that the processor controls the display panel to display a corresponding image according to the position information of the touch point.

In the narrow-frame touch display apparatus, the frame of the touch display screen is narrow, the user easily touches the touch display screen by mistake when holding the narrow-frame touch display apparatus to make the touch display screen display image, and therefore, an accuracy of touch control is relatively low.

SUMMARY

According to the embodiments of the disclosure, a touch method is provided. The touch method comprises: acquiring touch information corresponding to a touch operation, the touch information at least including a touch position and a touch area; determining a touch region according to the touch position; comparing the touch area with a reference area to obtain a comparison result; judging whether the touch operation is a mis-touch according to the comparison result and the touch region; not executing an instruction of the touch operation in the case that the touch operation is the mis-touch; and executing the instruction of the touch operation in the case that the touch operation is not the mis-touch.

For example, the touch region includes a touch peripheral region and a touch central region; in the case that the touch region is the touch peripheral region, the reference area is a first reference area; and in the case that the touch region is the touch central region, the reference area is a second reference area, and the second reference area is greater than the first reference area.

For example, before the determining the touch region according to the touch position, the method further comprises: comparing the touch area with a third reference area, a value of the third reference area being equal to a value of the second reference area; determining the touch operation to be the mis-touch in the case that the touch area is not less than the third reference area. The determining the touch region according to the touch position includes: determining the touch region according to the touch position in the case that the touch area is less than the third reference area.

For example, the judging whether the touch operation is the mis-touch according to the comparison result and the touch region includes: determining the touch operation not to be the mis-touch in the case that the touch region is the touch central region; determining the touch operation not to be the mis-touch in the case that the touch region is the touch peripheral region and the touch area is less than the first reference area; judging whether the touch operation is a predetermined touch operation in the case that the touch region is the touch peripheral region and the touch area is not less than the first reference area, the predetermined touch operation being a sliding touch operation or an interval touch operation; determining the touch operation not to be the mis-touch in the case that the touch operation is the predetermined touch operation; and determining the touch operation to be the mis-touch in the case that the touch operation is not the predetermined touch operation.

For example, the judging whether the touch operation is the mis-touch according to the touch region and the comparison result includes: determining the touch operation not to be the mis-touch in the case that the touch region is the touch peripheral region and the touch area is less than the first reference area; judging whether the touch operation is a predetermined touch operation in the case that the touch region is the touch peripheral region and the touch area is not less than the first reference area, the predetermined touch operation being a sliding touch operation or an interval touch operation; determining the touch operation not to be the mis-touch in the case that the touch operation is the predetermined touch operation; determining the touch operation to be the mis-touch in the case that the touch operation is not the predetermined touch operation; determining the touch operation not to be the mis-touch in the case that the touch region is the touch central region and the touch area is less than the second reference area; and determining the touch operation to be the mis-touch in the case that the touch region is the touch central region and the touch area is not less than the second reference area.

According to the embodiments of the disclosure, a touch device is provided. The touch device comprises: an acquiring module, for acquiring touch information corresponding to a touch operation, the touch information at least including a touch position and a touch area; a first determining module, for determining a touch region according to the touch position; a first comparing module, for comparing the touch area with a reference area to obtain a comparison result; a judging module, for judging whether the touch operation is a mis-touch according to the comparison result and the touch region; a first executing module, for not executing an instruction of the touch operation in the case that the touch operation is the mis-touch; a second executing module, for executing the instruction of the touch operation in the case that the touch operation is not the mis-touch.

For example, the touch region includes a touch peripheral region and a touch central region; in the case that the touch region is the touch peripheral region, the reference area is a first reference area; and in the case that the touch region is the touch central region, the reference area is a second reference area, and the second reference area is greater than the first reference area.

For example, the touch device further comprises: second comparing module, for comparing the touch area with a third reference area, a value of the third reference area being equal to a value of the second reference area; a second determining module, for determining the touch operation to be the mis-touch in the case that the touch area is not less than the third reference area; the first determining module being further configured for: determining the touch region according to the touch position in the case that the touch area is less than the third reference area.

For example, the judging module is further configured for: determining the touch operation not to be the mis-touch in the case that the touch region is the touch central region; determining the touch operation not to be the mis-touch in the case that the touch region is the touch peripheral region and the touch area is less than the first reference area; judging whether the touch operation is a predetermined touch operation in the case that the touch region is the touch peripheral region and the touch area is not less than the first reference area, the predetermined touch operation being a sliding touch operation or an interval touch operation; determining the touch operation not to be the mis-touch in the case that the touch operation is the predetermined touch operation; determining the touch operation to be the mis-touch in the case that the touch operation is not the predetermined touch operation.

For example, the judging module is further configured for: determining the touch operation not to be the mis-touch in the case that the touch region is the touch peripheral region and the touch area is less than the first reference area; judging whether the touch operation is a predetermined touch operation in the case that the touch region is the touch peripheral region and the touch area is not less than the first reference area, the predetermined touch operation being a sliding touch operation or an interval touch operation; determining the touch operation not to be the mis-touch in the case that the touch operation is the predetermined touch operation; determining the touch operation to be the mis-touch in the case that the touch operation is not the predetermined touch operation; determining the touch operation not to be the mis-touch in the case that the touch region is the touch central region and the touch area is less than the second reference area; determining the touch operation to be the mis-touch in the case that the touch region is the touch central region and the touch area is not less than the second reference area.

According to the embodiments of the disclosure, a touch display apparatus is provided. The touch display apparatus comprises the touch device as described above.

BRIEF DESCRIPTION OF THE DRAWINGS

In order to clearly illustrate the technical solution of the embodiments of the present disclosure, the drawings of the embodiments will be briefly described in the following; it is obvious that the described drawings are only related to some embodiments of the present disclosure and thus are not limitative of the present disclosure.

FIG. 2-1 is a flow chart of the touch method provided by the embodiments of the present disclosure;

FIG. 2-2 is a distribution schematic diagram of regions on a touch panel provided by the embodiments of the present disclosure;

FIG. 4-1 is a structural schematic diagram of a touch device provided by the embodiments of the present disclosure; and FIG. 4-2 is a structural schematic diagram of the touch device provided by the embodiments of the present disclosure.

DETAILED DESCRIPTION

In order to make the objective, technical solutions, and advantages of the present disclosure clearer, the technical solutions in the embodiments of the present disclosure are described more clearly and completely hereinafter in conjunction with the accompanying drawings. It is obvious that the described embodiments are just a part but not all of the embodiments of the present disclosure. Based on the described embodiments herein, those skilled in the art can obtain other embodiment(s), without any inventive work, which should be within the scope of the present disclosure.

Figure 1:
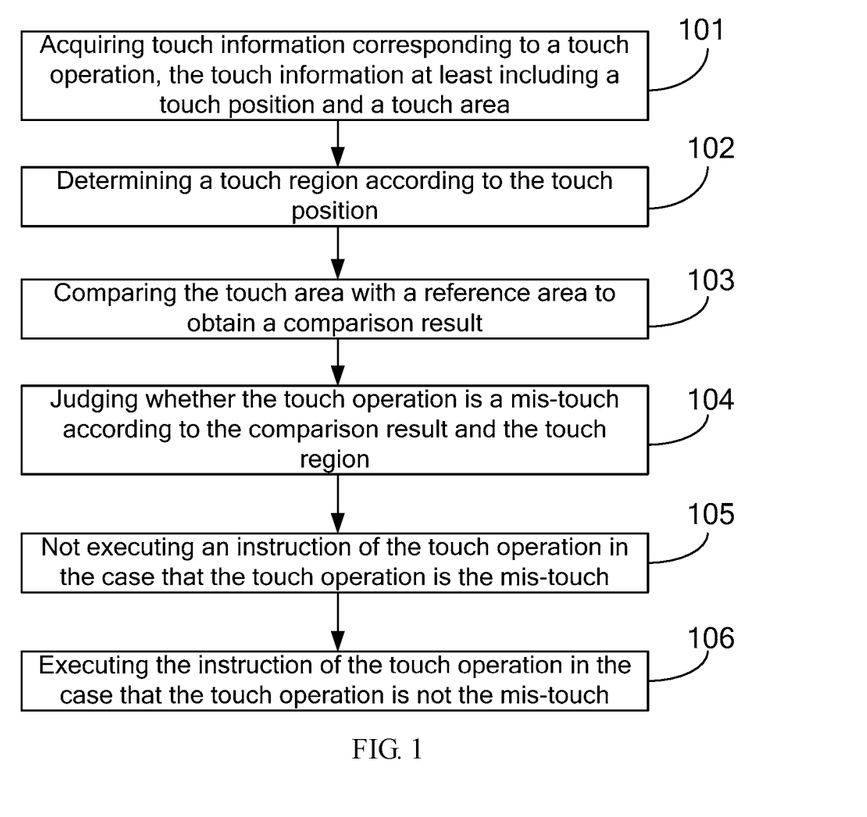
FIG. 1 is a flow chart of a touch method provided by embodiments of the present disclosure.

As shown in FIG. 1, the embodiments of the present disclosure provide a touch method, and the touch method, for example, comprises:

Step 101: acquiring touch information corresponding to a touch operation, the touch information at least including a touch position and a touch area.

Step 102: determining a touch region according to the touch position.

Step 103: comparing the touch area with a reference area to obtain a comparison result.

Step 104: judging whether the touch operation is a mis-touch according to the comparison result and the touch region.

Step 105: not executing an instruction of the touch operation in the case that the touch operation is the mis-touch.

Step 106: executing the instruction of the touch operation in the case that the touch operation is not a mis-touch.

In the touch method provided by the embodiments of the present disclosure, after the touch information corresponding to the touch operation is acquired, the touch region is determined according to the touch position, the touch area is compared with the reference area, and it is judged whether the touch operation is the mis-touch of a user according to the comparison result and the touch region, the instruction of the touch operation is not executed in the case that the touch operation is determined to be the mis-touch, and the instruction of the touch operation is executed in the case that the touch operation is determined not to be the mis-touch, so that the instruction of the touch operation is prevented from being executed in the case of the mis-operation of the user, thereby improving an accuracy of touch control.

For example, the touch region includes a touch peripheral region and a touch central region. In the case that the touch region is the touch peripheral region, the reference area is a first reference area; and in the case that the touch region is the touch central region, the reference area is a second reference area, the second reference area being greater than the first reference area.

For example, before step 102, the touch method further comprises: comparing the touch area with a third reference area, a value of the third reference area being equal to a value of the second reference area; and determining the touch operation to be the mis-touch in the case that the touch area is not less than the third reference area. For example, step 102 includes: determining the touch region according to the touch position in the case that the touch area is less than the third reference area. For example, step 104 includes: determining the touch operation not to be the mis-touch in the case that the touch region is the touch central region; determining the touch operation not to be the mis-touch in the case that the touch region is the touch peripheral region and the touch area is less than the first reference area; judging whether the touch operation is a predetermined touch operation in the case that the touch region is the touch peripheral region and the touch area is not less than the first reference area, the predetermined touch operation being a sliding touch operation or an interval touch operation; determining the touch operation not to be the mis-touch in the case that the touch operation is the predetermined touch operation; and determining the touch operation to be the mis-touch in the case that the touch operation is not the predetermined touch operation.

For example, step 104 includes: determining the touch operation not to be the mis-touch in the case that the touch region is the touch peripheral region and the touch area is less than the first reference area; judging whether the touch operation is the predetermined touch operation in the case that the touch region is the touch peripheral region and the touch area is not less than the first reference area, the predetermined touch operation being the sliding touch operation or the interval touch operation; determining the touch operation not to be the mis-touch in the case that the touch operation is the predetermined touch operation; determining the touch operation to be the mis-touch in the case that the touch operation is not the predetermined touch operation; determining the touch operation not to be the mis-touch in the case that the touch region is the touch central region and the touch area is less than the second reference area; and determining the touch operation to be the mis-touch in the case that the touch region is the touch central region and the touch area is not less than the second reference area.

In the touch method provided by the embodiments of the present disclosure, after the touch information corresponding to the touch operation is acquired, the touch region is determined according to the touch position, the touch area is compared with the reference area, and it is judged whether the touch operation is the mis-touch of a user according to the comparison result and the touch region, the instruction of the touch operation is not executed in the case that the touch operation is determined to be the mis-touch, and the instruction of the touch operation is executed in the case that the touch operation is determined not to be the mis-touch, so that the instruction of the touch operation is prevented from being executed in the case of the mis-operation of the user, thereby improving an accuracy of touch control.

Figure 21:
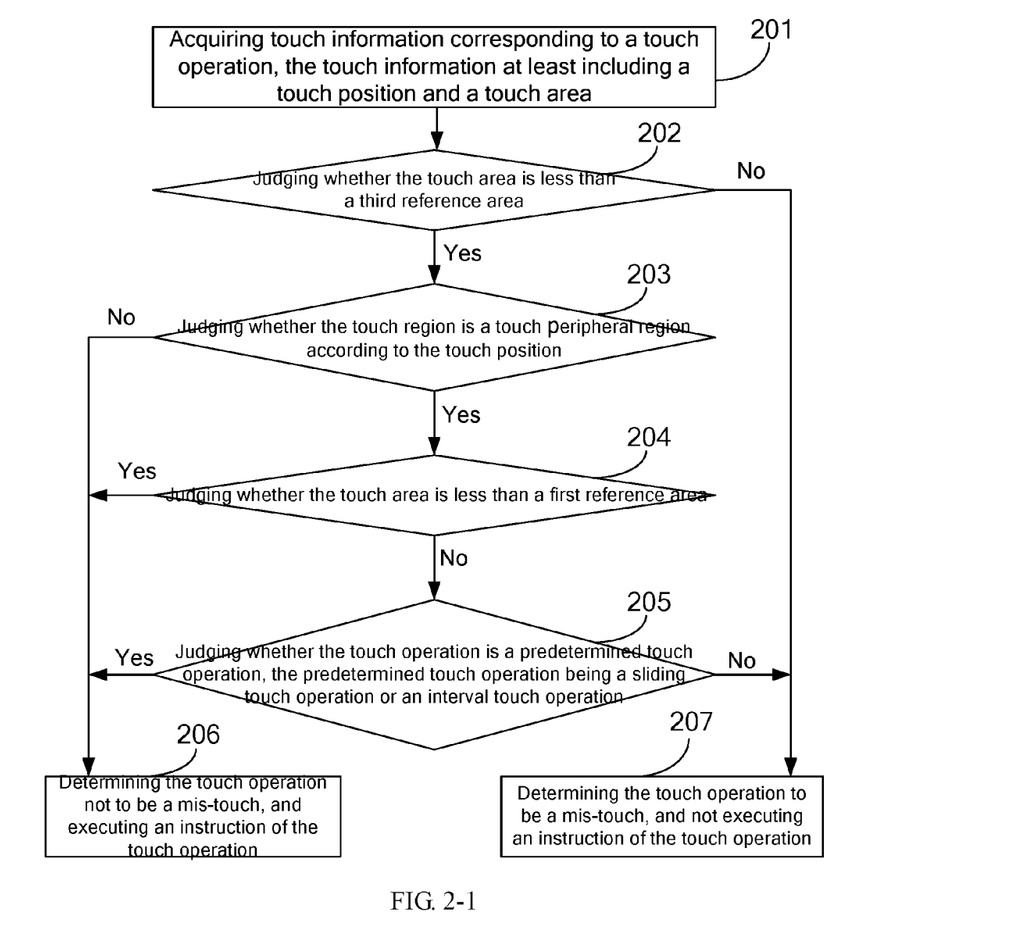

As shown in FIG. 2-1, the touch method provided by the embodiments of the present disclosure for example comprises:

Step 201: acquiring touch information corresponding to a touch operation, the touch information at least including a touch position and a touch area.

Exemplarily, a touch display screen for example includes a touch panel and a display panel which are stacked sequentially, and a user performs the touch operation (e.g., touching a certain position on the touch panel with a finger) on the touch panel according to an image displayed on the display panel. After the user performs the touch operation on the touch panel, the touch panel generates a touch signal. A touch IC is connected with the touch panel, and the touch IC acquires the touch signal generated by the touch panel, and determines the touch information according to the touch signal; and exemplarily, the touch information includes: the touch position and the touch area.

Step 202: judging whether the touch area is less than a third reference area. In the case that the touch area is less than the third reference area, step 203 is executed; and in the case that the touch area is not less than the third reference area, step 207 is executed.

A first reference area, a second reference area and a third reference area for example are stored in the touch IC previously, and a value of the third reference area for example is equal to a value of the second reference area. A corresponding relationship between the reference area and the touch region for example is further stored in the touch IC. For example, the touch region of the touch panel includes: a touch peripheral region and a touch central region; the touch peripheral region corresponds to the first reference area, the touch central region corresponds to the second reference area, and the second reference area is greater than the first reference area; because the value of the third reference area is equal to the value of the second reference area, the third reference area is also greater than the first reference area. After the touch information is acquired by the touch IC, the touch area in the touch information is directly compared with the third reference area. For example, a difference value between the touch area and the third reference area is acquired, and in the case that the difference value between the touch area and the third reference area is less than zero, the touch area is determined to be less than the third reference area; and in the case that the difference value between the touch area and the third reference area is greater than or equal to zero, the touch area is determined to be not less than (i.e., greater than or equal to) the third reference area. Exemplarily, the first reference area is an area of a circle having a diameter of 1.5 cm, and the second reference area and the third reference area are an area of a circle having a diameter of 3 cm.

In the case that the touch area is greater than or equal to the third reference area, step 207 is executed, to determine the touch operation on the touch panel to be the mis-touch of the user. In the case that the touch area is less than the third reference area, step 203 is executed to perform further judgment, so as to determine whether the touch operation on the touch panel is the mis-touch of the user.

Step 203: judging whether the touch region is the touch peripheral region according to the touch position. In the case that the touch region is the touch peripheral region, step 204 is executed; and in the case that the touch area is not the touch peripheral region, step 206 is executed.

Figure 22:
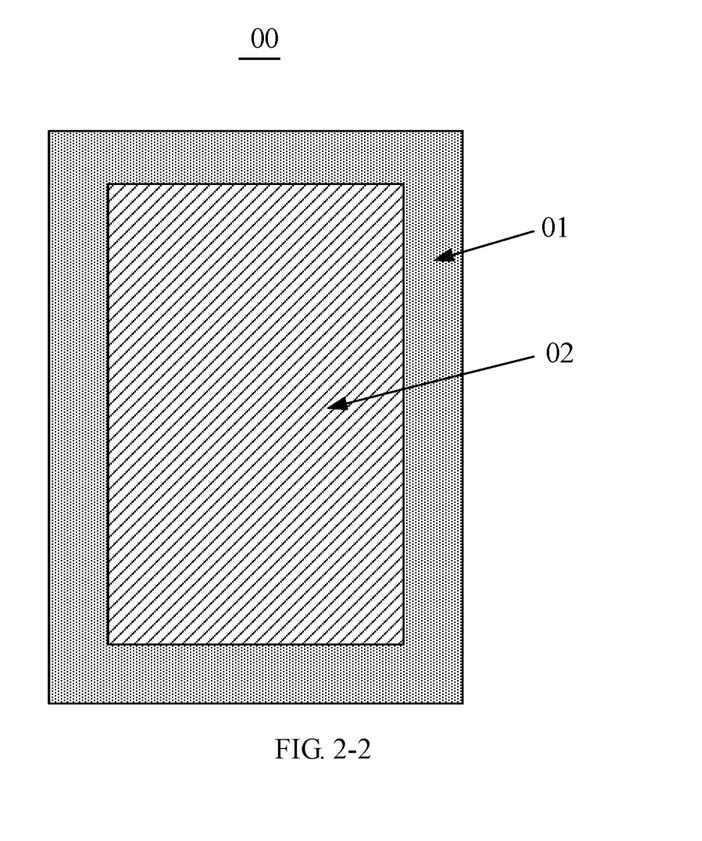

FIG. 2-2 is a distribution schematic diagram of regions on the touch panel provided by the embodiments of the present disclosure. As shown in FIG. 2-2, the touch panel 00 for example includes: the touch peripheral region 01 and the touch central region 02; the touch peripheral region 01 for example is a ring-shaped region, and the touch central region 02 for example is located inside the touch peripheral region 01, that is, the touch peripheral region 01 surrounds the touch central region 02, and the touch peripheral region 01 adjoins the touch central region 02. Exemplarily, in the case that the touch central region 02 is a rectangular region, the touch peripheral region 01 is a rectangular ring-shaped region; and in the case that the touch central region 02 is a circular region, the touch peripheral region 01 is a circle ring-shaped region. It should be noted that, FIG. 2 takes an example that the touch central region 02 is the rectangular region and the touch peripheral region 01 is the rectangular ring-shaped region.

In the case that the touch area is less than the third reference area, the touch IC determines a region on the touch panel where the touch position is located according to the touch position in the touch information, and judges whether the region on the touch panel where the touch position is located is the touch peripheral region. In the case that the touch area is less than the third reference area and the touch region is not the touch peripheral region (i.e., the touch region is the touch central region), that is, the touch area is less than the reference area (the second reference area) corresponding to the touch region (the touch central region) where the touch position is located, then at this time the touch operation on the touch panel is determined not to be the mis-touch of the user, and step 206 is executed. In the case that the touch area is less than the third reference area and the touch region is the touch peripheral region, it is necessary to perform further judgment, so as to determine whether the touch operation on the touch panel is the mis-touch of the user.

Step 204: judging whether the touch area is less than a first reference area. In the case that the touch area is less than the first reference area, step 206 is executed; and in the case that the touch area is not less than the first reference area, step 205 is executed.

Exemplarily, the touch IC compares the touch area with the reference area (i.e., the first reference area) corresponding to the touch peripheral region, and acquires a difference value between the touch area and the first reference area; in the case that the difference value between the touch area and the first reference area is less than zero, the touch area is determined to be less than the first reference area; and in the case that the difference value between the touch area and the first reference area is greater than or equal to zero, the touch area is determined to be not less than (i.e., greater than or equal to) the first reference area.

In the case that the touch area is less than the third reference area, the region where the touch position is located is the touch peripheral region, and the touch area is less than the first reference area, then at this time the touch operation on the touch panel is determined not to be the mis-touch of the user, and step 206 is executed. In the case that the touch area is less than the third reference area, the region where the touch position is located is the touch peripheral region, and the touch area is not less than the first reference area (i.e., the touch area is greater than or equal to the first reference area), since a touch area corresponding to a sliding touch operation or an interval touch operation in the touch peripheral region is not less than the first reference area, it is still necessary to perform further judgment, so as to determine whether the touch operation is the mis-touch of the user.

Step 205: judging whether the touch operation is a predetermined touch operation, the predetermined touch operation being a sliding touch operation or an interval touch operation. In the case that the touch operation is the predetermined touch operation, step 206 is executed. In the case that the touch operation is not the predetermined touch operation, step 207 is executed.

After it is determined that the touch area is less than the third reference area, the region where the touch position is located is the touch peripheral region and the touch area is not less than the first reference area, the touch IC judges whether the touch operation is same as the predetermined touch operation, and the predetermined touch operation for example is the sliding touch operation or the interval touch operation. Exemplarily, the sliding touch operation is that the user touches the touch panel with a finger and slides the finger while touching the touch panel. Exemplarily, the interval touch operation is that the user clicks the touch panel constantly.

In the case that the touch area is less than the third reference area, the region where the touch position is located is the touch peripheral region, the touch area is not less than the first reference area, and the touch operation is the predetermined touch operation, then the touch IC determines the touch operation not to be the mis-touch of the user and execute step 206; and in the case that the touch area is less than the third reference area, the region where the touch position is located is the touch peripheral region, the touch area is not less than the first reference area, and the touch operation is not the predetermined touch operation, then the touch IC determines the touch operation to be the mis-touch of the user and execute step 207.

Step 206: determining the touch operation not to be a mis-touch, and executing an instruction of the touch operation.

In the case that the touch IC determines the touch operation on the touch panel not to be the mis-touch of the user, the touch IC determines the instruction of the touch operation to be executed by the touch IC according to the touch operation, and executes the instruction of the touch operation, so as to control the display panel to display an image corresponding to the instruction of the touch operation.

Step 207: determining the touch operation to be the mis-touch, and not executing the instruction of the touch operation.

In the case that the touch IC determines the touch operation on the touch panel to be the mis-touch of the user, the touch IC ignores the touch operation, and does not execute the instruction of the touch operation.

As for solving a problem of avoiding the mis-touch of the user, there are provided two solutions in a related art.

First solution: the touch panel includes an active touch region and an inactive touch region; the inactive touch region is located on an edge of the touch panel, and the active touch region is located in a center of the touch panel. In the case that the touch operation performed by the user on the touch panel is detected, it is detected whether the touch operation is acted in the active touch region; in the case that it is acted in the active touch region, a response is made to the touch operation; and in the case that it is not acted in the active touch region, no response is made to the touch operation. In general, the user performs a great number of touch operations in the active touch region on the touch panel, and therefore, in the case that the user touches the inactive touch region on the edge of the touch panel with a palm by mistake, no response is made to the touch operation of the user, so as to effectively avoid the mis-touch of the user. However, in the case that the user needs to perform the touch operation in the inactive touch region, it is unable to achieve touch control in the inactive touch region because no response is made to the touch operation in the inactive touch region.

Second solution: the user clicks the screen, and it is judged whether an activated point of the screen is located in a screen edge region; if not, it is judged as an effective touch, and the system makes a response; if so, position information of touching a side surface of a mobile terminal by a finger root or a palm at the time of touching the screen with the finger is acquired by a touch positioning unit located on the side surface of the mobile terminal, and it is determined whether the touch is an inadvertent touch on a principle of proximity through a position activated by the finger on the screen and a position of the side surface of the mobile terminal touched by the finger; in the case that the principle of proximity is met, it is judged as the ineffective touch (mis-touch), and the system makes no response; and in the case that the principle of proximity is not met, it is judged as an effective touch, and the system makes a response. Since an implementation of the solution relies on the touch positioning unit provided on the side surface of the mobile terminal, that is, in order to implement the touch method, the touch positioning unit must be arranged on the side surface of the mobile terminal, resulting in a complex structure of the mobile terminal.

In the case that the narrow-frame touch display apparatus is a cell phone of the user, a frame of a touch display screen in the narrow-frame touch display apparatus is narrow. In the case that the user holds the cell phone, a palm of the user easily presses or slides on the touch panel, and a finger of the user easily touches a touch peripheral region of the touch panel by mistake. In the case that the user uses a touch pen to operate on the touch screen, an elbow or palm of the user easily touches a touch central region of the touch panel by mistake. In the case that the user is talking over the cell phone, a face of the user easily touches a touch central region of the touch panel by mistake. Generally, the touch operations performed by the user on the touch panel for example includes: a single-finger clicking operation, a multi-finger clicking operation, a sliding operation (in the case that it is necessary to switch pages), a multi-finger relative sliding operation (in the case that it is necessary to magnify an image), a single-pen touching or continuous clicking operation.

In the embodiments of the present disclosure, the touch region is determined according to the touch position, the touch area is compared with the reference area corresponding to the touch region, and the touch operation is compared with the predetermined operation: determining the touch operation to be the mis-touch in the case that the touch area is not less than the third reference area; determining the touch operation not to be the mis-touch in the case that the touch area is less than the third reference area and the touch region is the touch central region; determining the touch operation not to be the mis-touch in the case that the touch area is less than the third reference area, the touch region is the touch peripheral region and the touch area is less than the first reference area; determining the touch operation not to be the mis-touch in the case that the touch area is less than the third reference area, the touch region is the touch peripheral region, the touch area is not less than the first reference area and the touch operation is the predetermined touch operation; and determining the touch operation to be the mis-touch in the case that the touch area is less than the third reference area, the touch region is the touch peripheral region, the touch area is not less than the first reference area and the touch operation is not the predetermined touch operation.

In the case that the touch operation is determined as the mis-operation, the instruction of the touch operation is not executed; and in the case that the touch operation is not determined as the mis-operation, the instruction of the touch operation is executed. In this way, the instruction of the touch operation is prevented from being executed in the case of the mis-operation of the user. In the above cases of mis-touch or right touch of the user, the embodiments of the present disclosure accurately judge whether the touch operation on the touch panel is the mis-touch of the user, and the solution provided by the embodiments of the present disclosure does not need additional touch positioning unit, so that an accuracy of touch control is high.

In conclusion, in the touch method provided by the embodiments of the present disclosure, after touch information corresponding to the touch operation is acquired, the touch region is determined according to the touch position, the touch area is compared with the reference area, and it is judged whether the touch operation is the mis-touch of the user according to the comparison result and the touch region, the instruction of the touch operation is not executed in the case that the touch operation is the mis-touch, and the instruction of the touch operation is executed in the case that the touch operation is not the mis-touch. In this way, the instruction of the touch operation is prevented from being executed in the case of the mis-operation of the user, thereby improving an accuracy of touch control.

Figure 3:
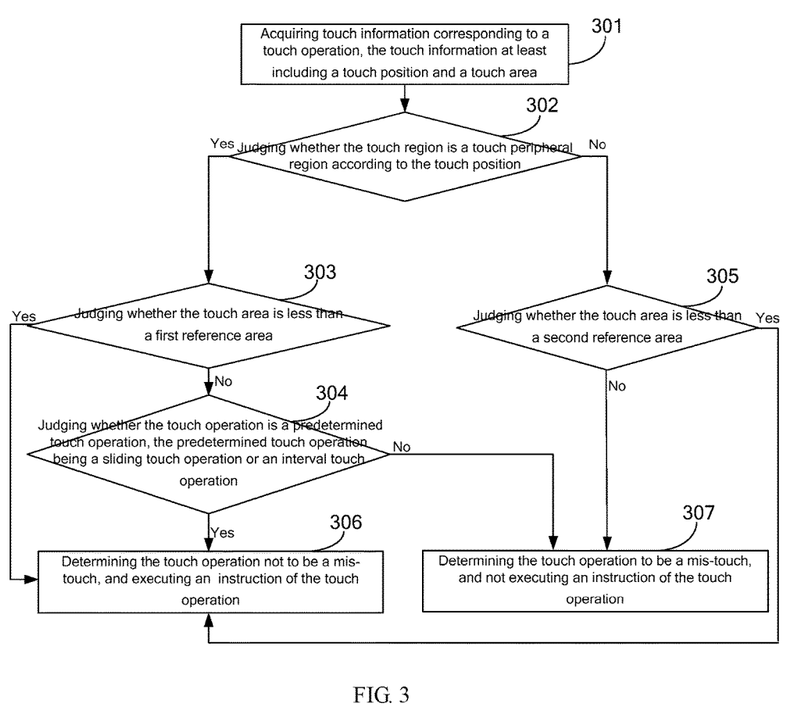
FIG. 3 is a flow chart of the touch method provided by the embodiments of the present disclosure.

As shown in FIG. 3, the touch method provided by the embodiments of the present disclosure for example includes:

Step 301: acquiring touch information corresponding to a touch operation, the touch information at least including a touch position and a touch area.

Execution of step 301 may refer to step 201 shown in FIG. 2-1, which will not be repeated here.

Step 302: judging whether the touch region is a touch peripheral region according to the touch position. In the case that the touch region is the touch peripheral region, step 303 is executed. In the case that the touch region is not the touch peripheral region, step 305 is executed.

For example, the touch IC determines the region on the touch panel where the touch position is located according to the touch position in the touch information, and judges whether the region on the touch panel where the touch position is located is the touch peripheral region. A manner of judging whether the touch operation is the mis-touch of the user is determined according to different touch regions.

Step 303: judging whether the touch area is less than a first reference area. In the case that the touch area is less than the first reference area, step 306 is executed; and in the case that the touch area is not less than the first reference area, step 304 is executed.

In the case that the touch region is the touch peripheral region, the touch IC compare the touch area with the reference area (i.e., the first reference area) corresponding to the touch peripheral region, and acquires a difference value between the touch area and the first reference area. In the case that the difference value between the touch area and the first reference area is less than zero, the touch area is determined to be less than the first reference area; and in the case that the difference value between the touch area and the first reference area is greater than or equal to zero, the touch area is determined to be not less than (i.e., greater than or equal to) the first reference area.

In the case that the region on the touch panel where the touch position is located is the touch peripheral region and the touch area is less than the first reference area, then at this time the touch operation on the touch panel is determined not to be the mis-touch of the user, and step 306 is executed. In the case that the region on the touch panel where the touch position is located is the touch peripheral region and the touch area is not less than (greater than or equal to) the first reference area, because a touch area corresponding to a sliding touch operation or an interval touch operation in the touch peripheral region is not less than the first reference area, it is still necessary to perform further judgment, so as to determine whether the touch operation is the mis-touch of the user.

Step 304: judging whether the touch operation is a predetermined touch operation, the predetermined touch operation being a sliding touch operation or an interval touch operation. In the case that the touch operation is the predetermined touch operation, step 306 is executed. In the case that the touch operation is not the predetermined touch operation, step 307 is executed.

After it is determined that the region where the touch position is located is the touch peripheral region and the touch area is not less than the first reference area, the touch IC judges whether the touch operation is same as the predetermined touch operation, and the predetermined touch operation is the sliding touch operation or the interval touch operation. Exemplarily, the sliding touch operation is that the user touches the touch panel with a finger and slides the finger while touching the touch panel. Exemplarily, the interval touch operation is that the user clicks the touch panel constantly.

In the case that the region where the touch position is located is the touch peripheral region, the touch area is not less than the first reference area, and the touch operation is the predetermined touch operation, then the touch IC determines the touch operation not to be the mis-touch of the user and executes step 306. In the case that the region where the touch position is located is the touch peripheral region, the touch area is not less than the first reference area, and the touch operation is not the predetermined touch operation, then the touch IC determines the touch operation to be the mis-touch of the user and executes step 307.

Step 305: judging whether the touch area is less than a second reference area. In the case that the touch area is less than the second reference area, step 306 is executed; and in the case that the touch area is not less than the second reference area, step 307 is executed.

In the case that the touch region is the touch central region, the touch IC compares the touch area with the reference area (i.e., the second reference area) corresponding to the touch central region, and acquires a difference value between the touch area and the second reference area. In the case that the difference value between the touch area and the second reference area is less than zero, the touch area is determined to be less than the second reference area; and in the case that the difference value between the touch area and the second reference area is greater than or equal to zero, the touch area is determined to be not less than (i.e., greater than or equal to) the second reference area.

In the case that the region where the touch position is located is the touch central region and the touch area is less than the second reference area, then at this time the touch operation on the touch panel is determined not to be the mis-touch of the user, and step 306 is executed. In the case that the region where the touch position is located is the touch central region and the touch area is not less than the second reference area, then at this time the touch operation on the touch panel is determined to be the mis-touch of the user, and step 307 is executed.

Step 306: determining the touch operation not to be a mis-touch, and executing an instruction of the touch operation.

Execution of step 306 may refer to step 206 shown in FIG. 2-1, which will not be repeated here.

Step 307: determining the touch operation to be the mis-touch, and not executing the instruction of the touch operation.

Execution of step 307 may refer to step 207 shown in FIG. 2-1, which will not be repeated here.

As for solving a problem of avoiding the mis-touch of the user, there are provided two solutions in a related art.

First solution: the touch panel includes an active touch region and an inactive touch region; the inactive touch region is located on an edge of the touch panel, and the active touch region is located in a center of the touch panel. In the case that the touch operation performed by the user on the touch panel is detected, it is detected whether the touch operation is acted in the active touch region; in the case that it is acted in the active touch region, a response is made to the touch operation; and in the case that it is not acted in the active touch region, no response is made to the touch operation. In general, the user performs a great number of touch operations in the active touch region on the touch panel, and therefore, in the case that the user touches the inactive touch region on the edge of the touch panel with a palm by mistake, no response is made to the touch operation of the user, so as to effectively avoid the mis-touch of the user. However, in the case that the user needs to perform the touch operation in the inactive touch region, it is unable to achieve touch control in the inactive touch region because no response is made to the touch operation in the inactive touch region.

Second solution: the user clicks the screen, and it is judged whether an activated point of the screen is located in a screen edge region; if not, it is judged as an effective touch, and the system makes a response; if so, position information of touching a side surface of a mobile terminal by a finger root or a palm at the time of touching the screen with the finger is acquired by a touch positioning unit located on the side surface of the mobile terminal, and it is determined whether the touch is an inadvertent touch on a principle of proximity through a position activated by the finger on the screen and a position of the side surface of the mobile terminal touched by the finger; in the case that the principle of proximity is met, it is judged as the ineffective touch (mis-touch), and the system makes no response; and in the case that the principle of proximity is not met, it is judged as an effective touch, and the system makes a response. Since an implementation of the solution relies on the touch positioning unit provided on the side surface of the mobile terminal, that is, in order to implement the touch method, the touch positioning unit must be arranged on the side surface of the mobile terminal, resulting in a complex structure of the mobile terminal.

In the case that the narrow-frame touch display apparatus is a cell phone of the user, a frame of a touch display screen in the narrow-frame touch display apparatus is narrow. In the case that the user holds the cell phone, a palm of the user easily presses or slides on the touch panel, and a finger of the user easily touches a touch peripheral region of the touch panel by mistake. In the case that the user uses a touch pen to operate on the touch screen, an elbow or palm of the user easily touches a touch central region of the touch panel by mistake. In the case that the user is talking over the cell phone, a face of the user easily touches a touch central region of the touch panel by mistake. Generally, the touch operations performed by the user on the touch panel for example includes: a single-finger clicking operation, a multi-finger clicking operation, a sliding operation (in the case that it is necessary to switch pages), a multi-finger relative sliding operation (in the case that it is necessary to magnify an image), a single-pen touching or continuous clicking operation.

In the embodiments of the present disclosure, the touch region is determined according to the touch position, the touch area is compared with the reference area corresponding to the touch region, and the touch operation is compared with the predetermined operation: determining the touch operation to be the mis-touch in the case that the touch region is the touch central region and the touch area is not less than the second reference area; determining the touch operation not to be the mis-touch in the case that the touch region is the touch central region and the touch area is less than the second reference area; determining the touch operation not to be the mis-touch in the case that the touch region is the touch peripheral region and the touch area is less than the first reference area; determining the touch operation not to be the mis-touch in the case that the touch region is the touch peripheral region, the touch area is not less than the first reference area and the touch operation is the predetermined touch operation; and determining the touch operation to be the mis-touch in the case that the touch region is the touch peripheral region, the touch area is not less than the first reference area and the touch operation is not the predetermined touch operation.

In the case that the touch operation is determined as the mis-operation, the instruction of the touch operation is not executed; and in the case that the touch operation is not determined as the mis-operation, the instruction of the touch operation is executed. In this way, the instruction of the touch operation is prevented from being executed in the case of the mis-operation of the user. In the above cases of mis-touch or right touch of the user, the embodiments of the present disclosure accurately judge whether the touch operation on the touch panel is the mis-touch of the user, and the solution provided by the embodiments of the present disclosure does not need additional touch positioning unit, so that an accuracy of touch control is high.

In conclusion, in the touch method provided by the embodiments of the present disclosure, the touch information corresponding to the touch operation is acquired, the touch region is determined according to the touch position, the touch area is compared with the reference area, and it is judged whether the touch operation is the mis-touch of the user according to the comparison result and the touch region, the instruction of the touch operation is not executed in the case that the touch operation is the mis-touch, and the instruction of the touch operation is executed in the case that the touch operation is not the mis-touch. In this way, the instruction of the touch operation is prevented from being executed in the case of the mis-operation of the user, thereby improving an accuracy of touch control.

Figure 41:
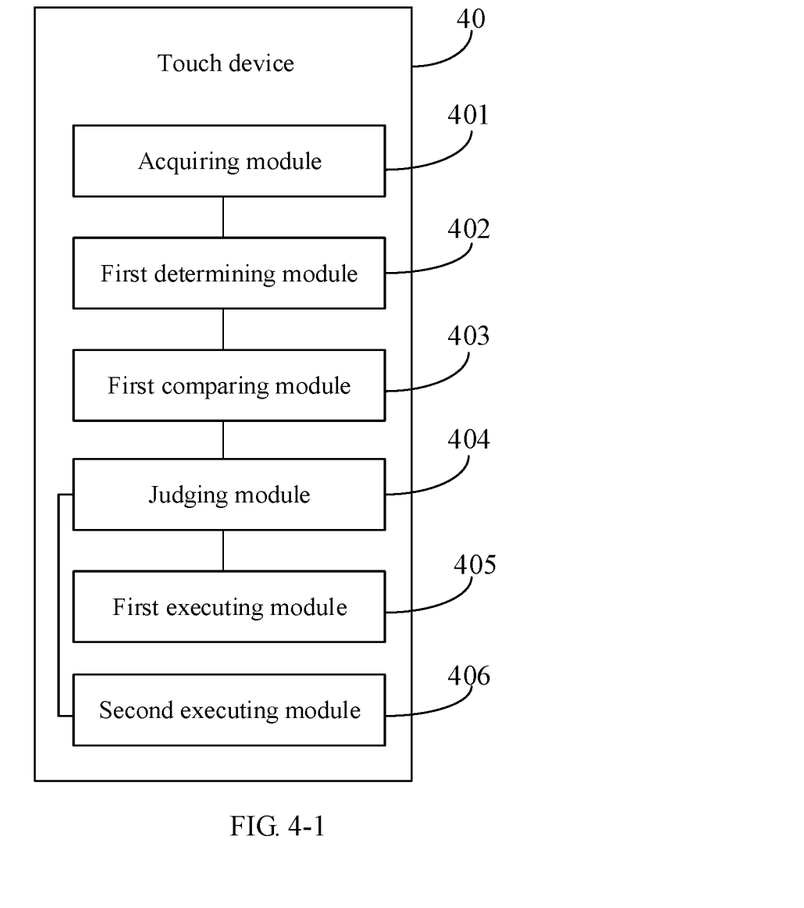

The embodiments of the present disclosure provide a touch device. As shown in FIG. 4-1, the touch device 40 for example comprises:

An acquiring module 401, for acquiring touch information corresponding to a touch operation, the touch information at least including a touch position and a touch area.

A first determining module 402, for determining a touch region is performed according to the touch position.

A first comparing module 403, for comparing the touch area with a reference area to obtain a comparison result.

A judging module 404, for judging whether the touch operation is a mis-touch according to the comparison result and the touch region.

A first executing module 405, for not executing an instruction of the touch operation in the case that the touch operation is the mis-touch.

A second executing module 406, for executing the instruction of the touch operation in the case that the touch operation is not the mis-touch.

For example, the touch region includes a touch peripheral region and a touch central region; in the case that the touch region is the touch peripheral region, the reference area is a first reference area; and in the case that the touch region is the touch central region, the reference area is a second reference area, the second reference area being greater than the first reference area.

In the touch device provided by the embodiments of the present disclosure, the acquiring module acquires touch information corresponding to the touch operation, the first determining module determines the touch region according to the touch position, the first comparing module compares the touch area with the reference area, the judging module judges whether the touch operation is the mis-operation of the user according to the comparison result and the touch region, the first executing module does not execute the instruction of the touch operation in the case that the touch operation is determined to be the mis-operation, and the second executing module executes the instruction of the touch operation in the case that the touch operation is determined not to be the mis-operation, so that the instruction of the touch operation is prevented from being executed in the case of the mis-operation of the user, thereby improving an accuracy of touch control.

For example, the judging module 404 is further configured for:

Determining the touch operation not to be the mis-touch in the case that the touch region is the touch peripheral region and the touch area is less than the first reference area;

Judging whether the touch operation is a predetermined touch operation in the case that the touch region is the touch peripheral region and the touch area is not less than the first reference area, the predetermined touch operation being a sliding touch operation or an interval touch operation;

Determining the touch operation not to be the mis-touch in the case that the touch operation is the predetermined touch operation;

Determining the touch operation to be the mis-touch in the case that the touch operation is not the predetermined touch operation.

Determining the touch operation not to be the mis-touch in the case that the touch region is the touch central region and the touch area is less than the second reference area;

Determining the touch operation to be the mis-touch in the case that the touch region is the touch central region and the touch area is not less than the second reference area.

In the touch device provided by the embodiments of the present disclosure, the acquiring module acquires touch information corresponding to the touch operation, the first determining module determines the touch region according to the touch position, the first comparing module compares the touch area with the reference area, the judging module judges whether the touch operation is the mis-operation of the user according to the comparison result and the touch region, the first executing module does not execute the instruction of the touch operation in the case that the touch operation is determined to be the mis-operation, and the second executing module executes the instruction of the touch operation in the case that the touch operation is determined not to be the mis-operation, so that the instruction of the touch operation is prevented from being executed in the case of the mis-operation of the user, thereby improving an accuracy of touch control.

Figure 42:
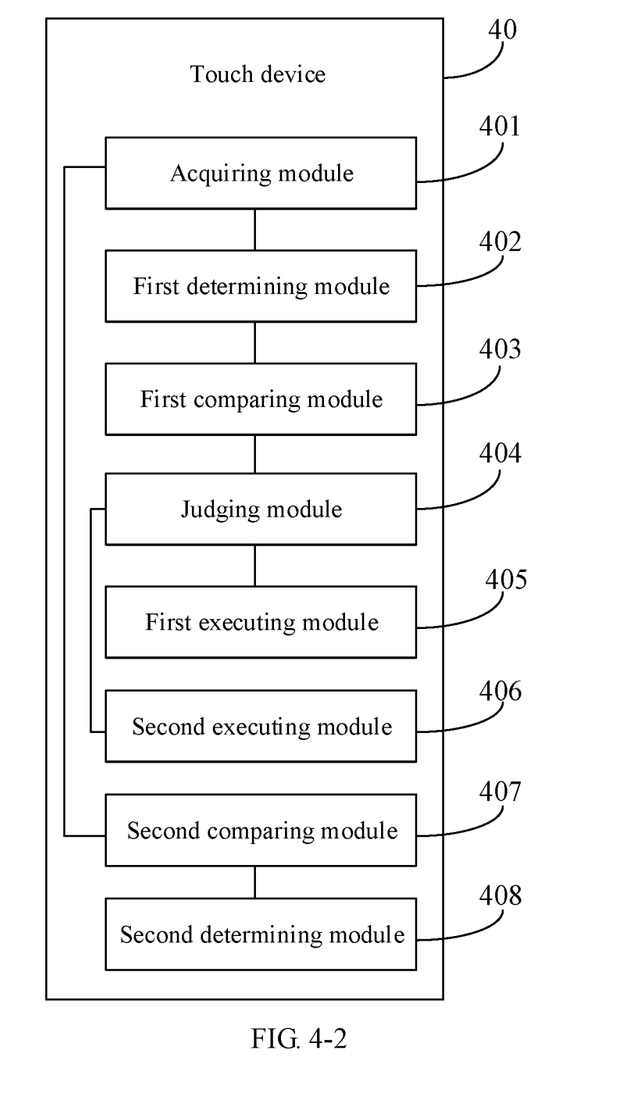

As shown in FIG. 4-2, the touch device 40 provided by the embodiments of the present disclosure for example comprises:

An acquiring module 401, for acquiring touch information corresponding to a touch operation, the touch information at least including a touch position and a touch area.

A first determining module 402, for determining a touch region according to the touch position.

A first comparing module 403, for comparing the touch area with a reference area to obtain a comparison result.

A judging module 404, for judging whether the touch operation is a mis-touch according to the comparison result and the touch region.

A first executing module 405, for not executing an instruction of the touch operation in the case that the touch operation is the mis-touch.

A second executing module 406, for executing the instruction of the touch operation in the case that the touch operation is not the mis-touch.

A second comparing module 407, for comparing the touch area with a third reference area, a value of the third reference area being equal to a value of a second reference area;

A second determining module 408, for determining the touch operation to be the mis-touch in the case that the touch area is not less than the third reference area;

For example, the first determining module 402 is further configured for: determining the touch region according to the touch position in the case that the touch area is less than the third reference area. For example, the judging module 404 is further configured for: determining the touch operation not to be the mis-touch in the case that the touch region is the touch central region; determining the touch operation not to be the mis-touch in the case that the touch region is the touch peripheral region and the touch area is less than the first reference area; judging whether the touch operation is a predetermined touch operation in the case that the touch region is the touch peripheral region and the touch area is not less than the first reference area, the predetermined touch operation being a sliding touch operation or an interval touch operation; determining the touch operation not to be the mis-touch in the case that the touch operation is the predetermined touch operation; and determining the touch operation to be the mis-touch in the case that the touch operation is not the predetermined touch operation.

In the touch device provided by the embodiments of the present disclosure, the acquiring module acquires touch information corresponding to the touch operation, the first determining module determines the touch region according to the touch position, the first comparing module compares the touch area with the reference area, the judging module judges whether the touch operation is the mis-operation of a user according to the comparison result and the touch region, the first executing module does not execute the instruction of the touch operation in the case that the touch operation is determined to be the mis-operation, and the second executing module executes the instruction of the touch operation in the case that the touch operation is determined not to be the mis-operation, so that the instruction of the touch operation is prevented from being executed in the case of the mis-operation of the user, thereby improving an accuracy of touch control.

The embodiments of the present disclosure provide a touch display apparatus, and the touch display apparatus for example comprises: the touch device shown in FIG. 4-1 or FIG. 4-2.

In the touch device of the touch display apparatus provided by the embodiments of the present disclosure, the acquiring module acquires touch information corresponding to the touch operation, the first determining module determines the touch region according to the touch position, the first comparing module compares the touch area with the reference area, the judging module judges whether the touch operation is the mis-operation of the user according to the comparison result and the touch region, the first executing module does not execute the instruction of the touch operation in the case that the touch operation is determined to be the mis-operation, and the second executing module executes the instruction of the touch operation in the case that the touch operation is determined not to be the mis-operation, so that the instruction of the touch operation is prevented from being executed in the case of the mis-operation of the user, thereby improving an accuracy of touch control.

It should be noted that the sequence of the steps of the touch method provided in the embodiments of the present disclosure can be properly adjusted, the steps can be correspondingly increased or reduced according to situations, varied methods easily conceived by any person skilled in the art in the technical scope of the present disclosure should fall within the protection scope of the present disclosure and thus are not repeated herein.

Those skilled in the art shall understand that the embodiments of the disclosure are able to be provided as a method, a system or a computer program product. Therefore, the disclosure can adopt forms of a complete hardware embodiment, a complete software embodiment or embodiment combining software and hardware. In addition, the disclosure can adopt the form of computer program product that is implemented on one or more computer applicable storage mediums (comprising, but not limited, disk memory, CD-ROM, optical memory, etc.) comprising computer applicable program codes therein.

The disclosure is described herein with reference to flowchart charts and/or block diagrams of methods, apparatuses (systems), and computer program products according to the embodiments of the disclosure. It should be understood that each flow and/or block in the flowchart and/or block diagram, and a combination of flow and/or block in the flowchart and/or block diagram can be implemented by computer program instructions. These computer program instructions may be provided to a general purpose computer, a special purpose computer, an embedded processor or a processor of other programmable data processing apparatus to form a machine, such that devices for implementing functions specified by one or more flows in the flowchart and/or one or more blocks in the block diagram may be generated by executing the instructions with the processor of the computer or other programmable data processing apparatus.

These computer program instructions may also be stored in a computer-readable memory that can direct the computer or other programmable data processing apparatus to operate in a given manner, so that the instructions stored in the computer-readable memory produce a manufactured article comprising an instruction device, and the instruction device implements the functions specified by one or more flows in the flowchart and/or one or more blocks in the block diagram.

These computer program instructions may also be loaded onto the computer or other programmable data processing apparatus, such that a series of process steps may be executed on the computer or other programmable data processing apparatus to produce process implemented by the computer, thereby, the instructions executed on the computer or other programmable data processing apparatus provide steps of implementing the functions specified by one or more flows in the flowchart and/or one or more blocks in the block diagram.

The foregoing embodiments merely are exemplary embodiments of the present disclosure, and not intended to define the scope of the present disclosure, and the scope of the disclosure is determined by the appended claims.

The present application claims priority of Chinese Patent Application No. 201610173681.0 filed on Mar. 24, 2016, the present disclosure of which is incorporated herein by reference in its entirety as part of the present application.

The invention claimed is:

1. A touch device, comprising a touch integrated circuit, wherein, the touch integrated circuit comprises:
  an acquiring sub circuit, for acquiring touch information corresponding to a touch operation, the touch information at least including a touch position and a touch area;
  a first determining sub circuit, for determining a touch region according to the touch position;
  a first comparing sub circuit, for comparing the touch area with a reference area to obtain a comparison result;
  a judging sub circuit, for judging whether the touch operation is a mis-touch according to the comparison result and the touch region;
  a first executing sub circuit, for not executing an instruction of the touch operation in the case that the touch operation is the mis-touch; and
  a second executing sub circuit, for executing the instruction of the touch operation in the case that the touch operation is not the mis-touch, wherein,
  the touch region includes a touch peripheral region and a touch central region;
  in the case that the touch region is the touch peripheral region, the reference area is a first reference area;
  in the case that the touch region is the touch central region, the reference area is a second reference area, and the second reference area is greater than the first reference area; and
  the judging sub circuit is further configured for:
    judging whether the touch operation is a predetermined touch operation within the touch peripheral region in the case that the touch region is the touch peripheral region and the touch area is not less than the first reference area, the predetermined touch operation within the touch peripheral region being a sliding touch operation or an interval touch operation;
    determining the touch operation not to be the mis-touch in the case that the touch operation is the predetermined touch operation within the touch peripheral region; and
    determining the touch operation to be the mis-touch in the case that the touch operation is not the predetermined touch operation within the touch peripheral region.

2. The device according to claim 1, wherein, the touch integrated circuit further comprises:
  a second comparing sub circuit, for comparing the touch area with a third reference area, a value of the third reference area being equal to a value of the second reference area;
  a second determining sub circuit, for determining the touch operation to be the mis-touch in the case that the touch area is not less than the third reference area;
  the first determining sub circuit being further configured for: determining the touch region according to the touch position in the case that the touch area is less than the third reference area.

3. The device according to claim 2, wherein,
the judging sub circuit is further configured for:
  determining the touch operation not to be the mis-touch in the case that the touch region is the touch central region;
  determining the touch operation not to be the mis-touch in the case that the touch region is the touch peripheral region and the touch area is less than the first reference area.

4. The device according to claim 1, wherein,
the judging sub circuit is further configured for:
  determining the touch operation not to be the mis-touch in the case that the touch region is the touch peripheral region and the touch area is less than the first reference area;
  determining the touch operation not to be the mis-touch in the case that the touch region is the touch central region and the touch area is less than the second reference area;
  determining the touch operation to be the mis-touch in the case that the touch region is the touch central region and the touch area is not less than the second reference area.

5. A touch display apparatus, comprising the touch device according to claim 1.

6. A system comprising a processor to perform a touch method, comprising:
  acquiring touch information corresponding to a touch operation, the touch information at least including a touch position and a touch area;
  determining a touch region according to the touch position;
  comparing the touch area with a reference area to obtain a comparison result;
  judging whether the touch operation is a mis-touch according to the comparison result and the touch region;
  not executing an instruction of the touch operation in the case that the touch operation is the mis-touch; and
  executing the instruction of the touch operation in the case that the touch operation is not the mis-touch, wherein,
  the touch region includes a touch peripheral region and a touch central region;
  in the case that the touch region is the touch peripheral region, the reference area is a first reference area;
  in the case that the touch region is the touch central region, the reference area is a second reference area, and the second reference area is greater than the first reference area,
  the judging whether the touch operation is the mis-touch according to the comparison result and the touch region includes:
    judging whether the touch operation is a predetermined touch operation within the touch peripheral region in the case that the touch region is the touch peripheral region and the touch area is not less than the first reference area, the predetermined touch operation within the touch peripheral region being a sliding touch operation or an interval touch operation;
    determining the touch operation not to be the mis-touch in the case that the touch operation is the predetermined touch operation within the touch peripheral region; and
    determining the touch operation to be the mis-touch in the case that the touch operation is not the predetermined touch operation within the touch peripheral region.

7. The system comprising the processor to perform the method according to claim 6, wherein,
  before the determining the touch region according to the touch position, the method further comprises:

comparing the touch area with a third reference area, a value of the third reference area being equal to a value of the second reference area;
determining the touch operation to be the mis-touch in the case that the touch area is not less than the third reference area;
the determining the touch region according to the touch position includes:
determining the touch region according to the touch position in the case that the touch area is less than the third reference area.

8. The system comprising the processor to perform the method according to claim 7, wherein,
the judging whether the touch operation is the mis-touch according to the comparison result and the touch region includes:
determining the touch operation not to be the mis-touch in the case that the touch region is the touch central region;
determining the touch operation not to be the mis-touch in the case that the touch region is the touch peripheral region and the touch area is less than the first reference area.

9. The system comprising the processor to perform the method according to claim 6, wherein,
the judging whether the touch operation is the mis-touch according to the touch region and the comparison result includes:
determining the touch operation not to be the mis-touch in the case that the touch region is the touch peripheral region and the touch area is less than the first reference area;
determining the touch operation not to be the mis-touch in the case that the touch region is the touch central region and the touch area is less than the second reference area; and
determining the touch operation to be the mis-touch in the case that the touch region is the touch central region and the touch area is not less than the second reference area.

10. A system comprising a processor to perform a touch method, comprising:
acquiring touch information corresponding to a touch operation, the touch information at least including a touch position and a touch area;
determining a touch region according to the touch position;
comparing the touch area with a reference area to obtain a comparison result;
judging whether the touch operation is a mis-touch according to the comparison result and the touch region;
not executing an instruction of the touch operation in the case that the touch operation is the mis-touch; and
executing the instruction of the touch operation in the case that the touch operation is not the mis-touch, wherein,
the touch region includes a touch peripheral region and a touch central region;
in the case that the touch region is the touch peripheral region, the reference area is a first reference area;
in the case that the touch region is the touch central region, the reference area is a second reference area, and the second reference area is greater than the first reference area, the judging whether the touch operation is the mis-touch according to the comparison result and the touch region includes:
judging whether the touch operation is a predetermined touch operation within the touch peripheral region in the case that the touch region is the touch peripheral region and the touch area is not less than the first reference area, the predetermined touch operation within the touch peripheral region being a sliding touch operation;
determining the touch operation not to be the mis-touch in the case that the touch operation is the predetermined touch operation within the touch peripheral region; and
determining the touch operation to be the mis-touch in the case that the touch operation is not the predetermined touch operation within the touch peripheral region.

11. The system comprising the processor to perform the method according to claim 10, wherein,
before the determining the touch region according to the touch position, the method further comprises:
comparing the touch area with a third reference area, a value of the third reference area being equal to a value of the second reference area;
determining the touch operation to be the mis-touch in the case that the touch area is not less than the third reference area;
the determining the touch region according to the touch position includes:
determining the touch region according to the touch position in the case that the touch area is less than the third reference area.

12. The system comprising the processor to perform the method according to claim 11, wherein,
the judging whether the touch operation is the mis-touch according to the comparison result and the touch region includes:
determining the touch operation not to be the mis-touch in the case that the touch region is the touch central region;
determining the touch operation not to be the mis-touch in the case that the touch region is the touch peripheral region and the touch area is less than the first reference area.

13. The system comprising the processor to perform the method according to claim 10, wherein,
the judging whether the touch operation is the mis-touch according to the touch region and the comparison result includes:
determining the touch operation not to be the mis-touch in the case that the touch region is the touch peripheral region and the touch area is less than the first reference area;
determining the touch operation not to be the mis-touch in the case that the touch region is the touch central region and the touch area is less than the second reference area; and
determining the touch operation to be the mis-touch in the case that the touch region is the touch central region and the touch area is not less than the second reference area.

* * * * *